United States Patent
Mankovskii et al.

(10) Patent No.: US 9,503,860 B1
(45) Date of Patent: Nov. 22, 2016

(54) INTELLIGENT PURSUIT DETECTION

(71) Applicants: Serguei Mankovskii, Morgan Hill, CA (US); Steven L. Greenspan, Scotch Plains, NJ (US); Maria C. Velez-Rojas, San Jose, CA (US)

(72) Inventors: Serguei Mankovskii, Morgan Hill, CA (US); Steven L. Greenspan, Scotch Plains, NJ (US); Maria C. Velez-Rojas, San Jose, CA (US)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 14/849,599

(22) Filed: Sep. 10, 2015

(51) Int. Cl.
*H04W 64/00* (2009.01)
*H04W 4/02* (2009.01)

(52) U.S. Cl.
CPC ............. *H04W 4/027* (2013.01); *H04W 4/023* (2013.01)

(58) Field of Classification Search
CPC .................. G06F 17/30339; G06F 17/30598; G06F 17/30867; G06F 17/50; H04L 65/60; H04L 67/32; H04L 51/22; G06T 19/20; G08B 1/08
USPC ........ 455/456.3; 345/419; 701/1; 340/573.4; 705/7.19
See application file for complete search history.

(56) References Cited

U.S. PATENT DOCUMENTS

| 2005/0068171 | A1 | 3/2005 | Kelliher et al. |
| 2008/0094230 | A1* | 4/2008 | Mock ........................ G08B 1/08 340/573.4 |

OTHER PUBLICATIONS

Whitney, Lance. "Google Glass app can identify people by their clothes". CNET. Mar. 8, 2013. (Retrieved from http://www.cnet.com/news/google-glass-app-can-identify-people-by-their-clothes/ on Sep. 10, 2015).

* cited by examiner

*Primary Examiner* — Phuoc H Doan
(74) *Attorney, Agent, or Firm* — Baker Botts L.L.P.

(57) ABSTRACT

Systems and methods may include receiving first motion data corresponding to a first object and receiving second motion data corresponding to a second object. The systems and methods may include determining whether the second object is following the first object based on the first motion data and the second motion data. The systems and methods may include receiving additional information corresponding to the second object. The systems and methods may include determining whether the second object poses a risk to the first object based on the additional information. The systems and methods may include performing processes in response to determining that the second object is following the first object and poses a risk to the first object. Such processes may include providing a notification to a subscribing party. The notification may indicate that the second object is following the first object and poses a risk to the first object.

20 Claims, 8 Drawing Sheets

INTELLIGENT PURSUIT DETECTION

BACKGROUND

The present disclosure relates to threat detection and positional awareness and, more specifically, to systems and methods for intelligent pursuit detection.

Existing mapping applications permit users to share their locations with one another so that their friends, family, coworkers, and other acquaintances may know where such users are located at any given point in time. This may permit such users to share their experiences with others, to passively inform friends and family of their safety, to inform supervisors of their location, and to make it easier to meet in unfamiliar locations.

Portable devices, such as cellular phones, tablets, smart watches, and other wearable devices, which are typically carried by a single individual, have become ubiquitous. Such devices may include global positioning satellite ("GPS") systems that may enable the devices to track their users' positions and transmit position information to a mapping application, such as the existing mapping applications described above.

BRIEF SUMMARY

According to an aspect of the present disclosure, a method may include several processes. In particular, the method may include receiving first motion data corresponding to a first object. The method also may include receiving second motion data corresponding to a second object. Further, the method may include determining whether the second object is following the first object based on the first motion data and the second motion data. Moreover, the method may include receiving additional information corresponding to the second object. Further still, the method may include, determining whether the second object poses a risk to the first object based on the additional information. In addition, the method may include performing processes in response to determining that the second object is following the first object and that the second object poses a risk to the first object. Such processes may include providing a notification to a subscribing party. The notification may indicate that the second object is following the first object and poses a risk to the first object.

Other features and advantages will be apparent to persons of ordinary skill in the art from the following detailed description and the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
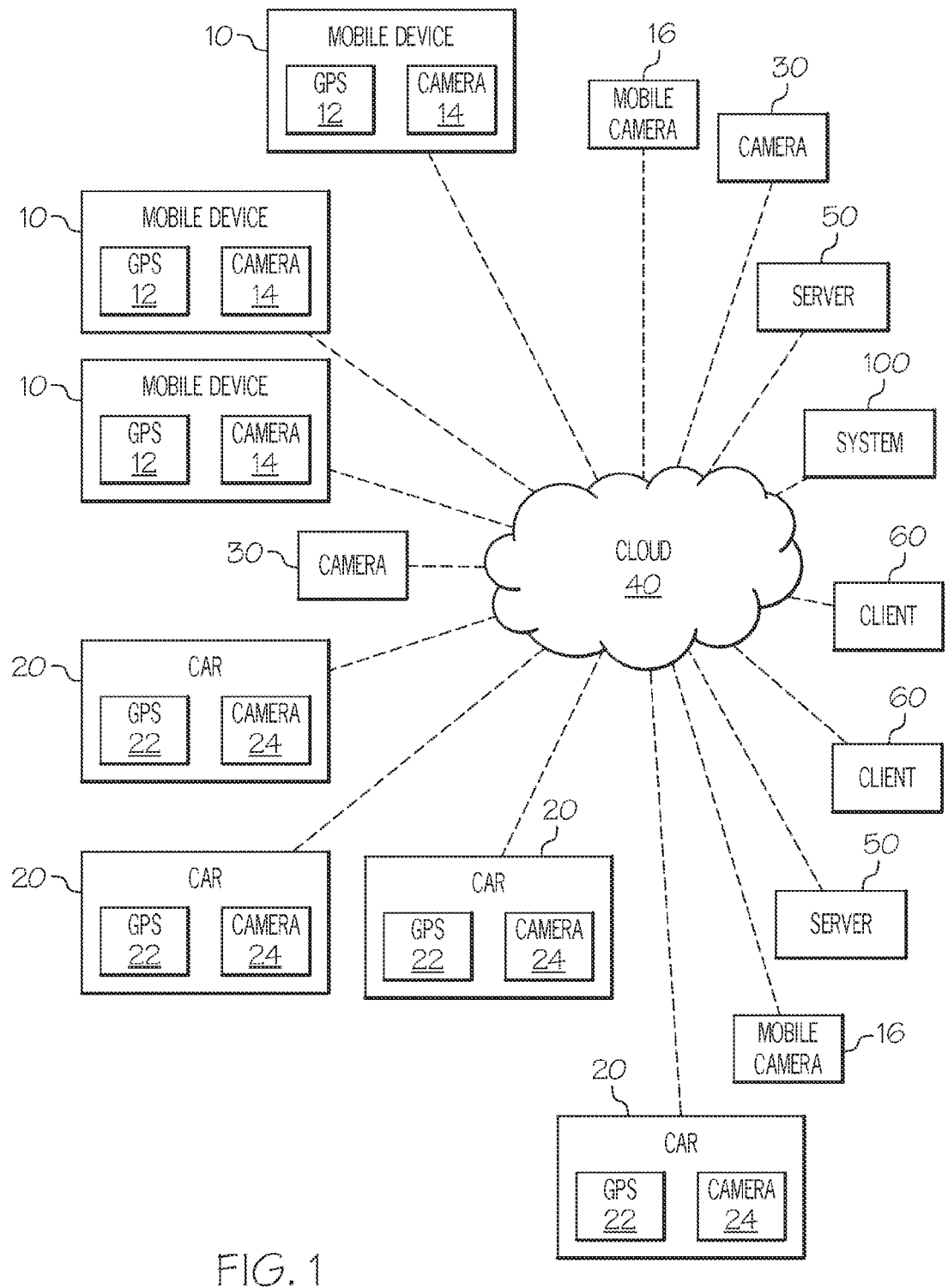
FIG. 1 is a schematic representation of a network through which devices associated with intelligent pursuit detection processing may intercommunicate.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or in a combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would comprise the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any tangible medium able to contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take a variety of forms comprising, but not limited to, electro-magnetic, optical, or a suitable combination thereof. A computer readable signal medium may be a computer readable medium that is not a computer readable storage medium and that is able to communicate, propagate, or transport a program for use by or in connection with an instruction execution system, apparatus, or device. Program code embodied on a computer readable signal medium may be transmitted using an appropriate medium, comprising but not limited to wireless, wireline, optical fiber cable, RF, etc., or any suitable combination of the foregoing.

Computer program code for carrying out operations for aspects of the present disclosure may be written in a combination of one or more programming languages, comprising an object oriented programming language such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider) or in a cloud computing environment or offered as a service such as a Software as a Service ("SaaS").

Aspects of the present disclosure are described herein with reference to flowchart illustrations and/or block diagrams of methods, apparatuses (e.g., systems), and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that, when executed, may direct a computer, other programmable data processing apparatus, or other devices to function in a particular manner, such that the instructions, when stored in the computer readable medium, produce an article of manufacture comprising instructions which, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses, or other devices to produce a computer implemented process, such that the instructions which execute on the computer or other programmable apparatus provide processes for implementing the functions/acts specified in the flowchart and/or block diagram block or blocks.

While certain example systems and methods disclosed herein may be described with reference to threat detection, systems and methods disclosed herein may be related to any field. Moreover, certain examples disclosed herein may be described with respect to nefarious activity and personal safety, but systems and methods contemplated by this application may be applied to any other field that may involve movable elements, such as manufacturing, delivery, transportation (e.g., air, land, sea), and a plurality of other fields, for example.

Systems and methods disclosed herein may provide for personal safety/security based on automatic detection of objects while taking into consideration usual roadway traffic density at the location at the given time.

Stalking and following are common precursors and indicators of crime activity. Systems and methods disclosed herein may utilize sensors to detect frequently appearing shapes, faces, cars, and other objects that follow the movements and positions of a protected subject.

Systems and methods disclosed herein may alarm a user about the fact that one or more targets detected by continuously (or periodically) sensing the environment are following a protected subject. The pursuit may be detected by computing the probability of a target appearing in the field of view or within close proximity of the protected subject. The system may periodically scan surrounding space in the field of view of the protected subject, may detect shapes, faces, vehicles, license plates, and other objects that match previously-identified objects, and may compute the probability of the target being in the field of view relative to the randomness of the environment (e.g., the entropy of the environment).

Systems and methods disclosed herein may increase personal safety by using wearable sensing devices. Wearable devices are becoming readily available; however, the use of such devices is still limited mostly to logistics and health applications. Systems and methods disclosed herein may provide a personal physical safety application using wearable sensing technology.

Systems and methods disclosed herein may utilize a Personal Surrounding Awareness System ("PSAS"), a GPS Mapping System ("GPSMS"), a Trajectory and Speed Tracking System ("TSTS"), a Stalking Likelihood Computation System ("SLCS"), and a Stalking Alert API ("SAAPI"). The PSAS, GPSMS, TSTS, SLCS, and SAAPI may be implemented by one or more system 100, which is described below in more detail.

The PSAS may expand an individual's field of vision beyond the individual's natural periphery to promote safety awareness, for example. An example PSAS is set forth in U.S. Pat. No. 8,704,661, which describes a wearable optical relay that is disposed to view an environment outside a user's line of sight and that provides relevant/non-extraneous information to the user about objects in such environment. The PSAS may be implemented by cameras and/or other sensors that may relay visual, auditory, haptic, or other signals to an individual, for example.

The GPSMS may provide information about streets, close by attractions, and other features that might attract pedestrian or vehicular traffic. This information may be used to compute the entropy of an environment (e.g., geography), as described in more detail below.

The TSTS may be a cloud-based service that keeps track of detected objects in respect to trajectory of a protected subject.

The SLCS may generate a score that indicates the likelihood that a detected object is deliberately following (or has deliberately followed) the protected subject. The SLCS may compute a score based on an entropy metric that may be computed by analyzing the number of possible common destinations and routes to such destinations relative to the location of the protected subject along with detected objects. For example, if a protected subject is located on a four-lane highway with a relatively small number of ingress/egress points, then the entropy of the environment would be low. If the protected subject is located in a dense urban area with many roads and possible destinations, then entropy of the environment would be high.

The SLCS may perform the following processes, for example:
  1. Determine location of the detected subject (e.g., a subject that has been determined to be following the protected subject) using data from the TSTS.

2. Compile a list of detected objects using data from the TSTS.
3. For each scanning location:
   a. Determine typical traffic density in the given location at a given time.
   b. Detect objects appearing in the vicinity of the protected subject (or in the vicinity of the sensor) at the location.
   c. For every object in the vicinity:
      i. If the object was not detected earlier, continue with the process and detect a next object.
      ii. If object was detected in the same location as before, continue with the process and detect the next object:
         1. Compute the probability of a random object being in the location.
         2. Compute the probability of seeing this object given the probability of the object being seen before in the previous location.
         3. Compute the probability that seeing the object previously and currently could be attributed to chance.
      iii. If probability of seeing object in the location and probability of seeing the object in the location being attributed to chance are below pre-defined threshold, then generate an alarm about a possible pursuit.

The thresholds of probability described above may be used to indicate the level of the protected subject's expectation to be followed. If the expectation of pursuit is greater, the threshold of probability should be less. The protected subject also may set up a threshold of probability for automatic alerting. If this threshold is breached, the system may issue an alarm, such as an automatic 911 call, text message, and/or tweet, for example.

The SAAPI may be implemented as a representational state transfer ("REST") system, a simple object access protocol ("SOAP") system, and/or a messaging and/or pub/sub notification system. The SAAPI may provide a mechanism for triggering automated processes that may be associated with a user's belief that such user is being pursued and/or the SLSC's determination of a high probability that the user (or other object) is being pursued.

Figure 8:
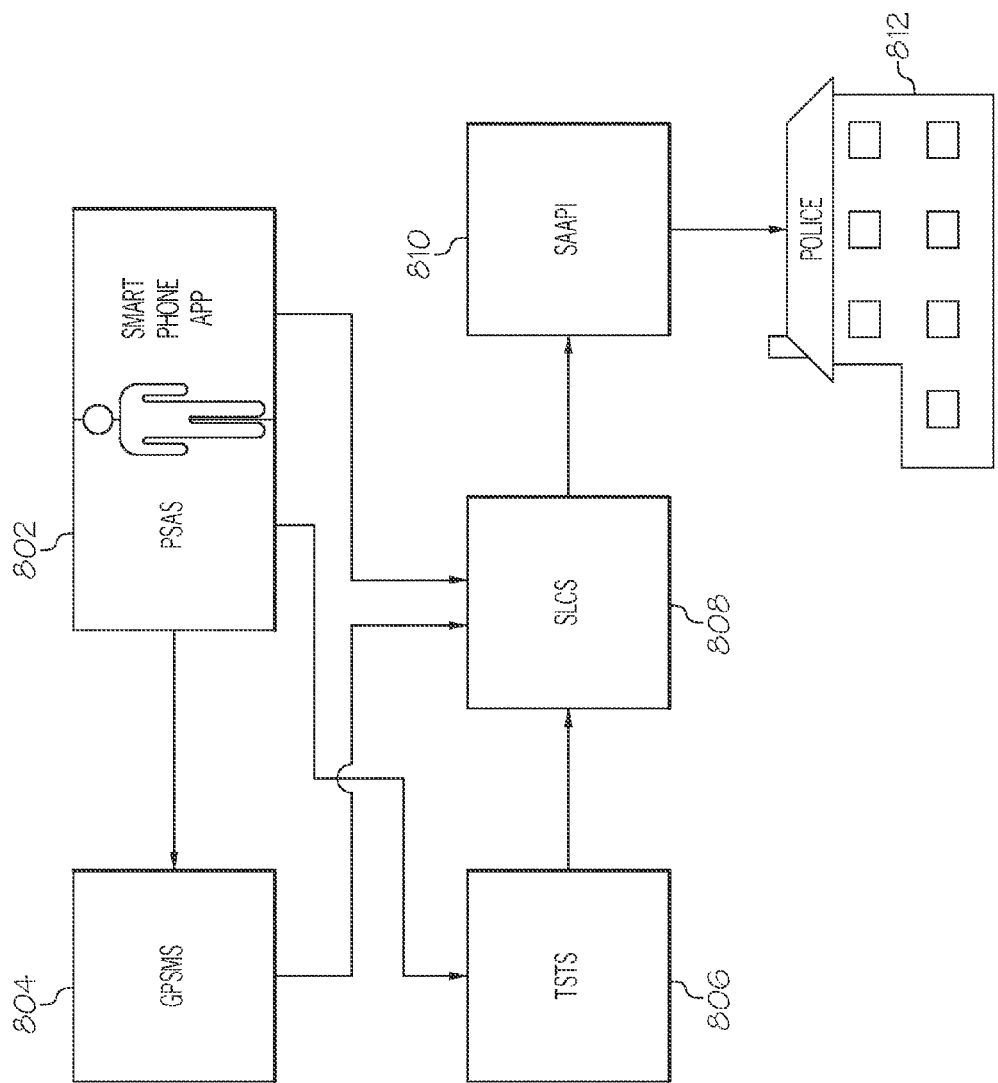
FIG. 8 is a schematic representation of system components configured to implement intelligent pursuit detection processing.

FIG. 8 shows an example configuration in which the PSAS, GPSMS, TSTS, SLCS, and SAAPI operate together to implement intelligent pursuit detection. PSAS 802 may be located on and/or around a protected person and may supply information to GPSMS 804 and TSTS 806 on a continuous basis. GPSMS 804 and TSTS 806 may report the position and trajectory of the protected person, as well as the position and trajectory of other detected objects, to SLCS 808. SLCS 808 may compute a probability of pursuit and may report an elevated level of probability to SAAPI 810 when such level of probability is computed. In some configurations, the protected person may even directly send a request to SLCS 808 via an app on a smart phone to validate suspicion of pursuit. SAAPI 810 may notify police 812 or another party about the suspected pursuit.

Referring now to FIG. 1, a network through which devices associated with intelligent pursuit detection processing may intercommunicate now is described.

The network of FIG. 1 may comprise one or more clouds 40, which may be public clouds, private clouds, community clouds, or some combination thereof. Each cloud may permit the exchange of information and the provisioning of services among devices and/or applications that are connected to such clouds. Such clouds 40 may utilize a wide area network, such as the Internet; a local area network, such as an intranet; a cellular network, such as a network using CDMA, GSM, 3G, 4G, LTE, or other protocols; a machine-to-machine network, such as a network using the MQTT protocol, the Wi-Fi Direct protocol, the NFC protocol, the Blutooth protocol, and/or another type of machine-to-machine protocol; another type of network; or some combination of the aforementioned networks. The network may be a closed, private network, an open network, or some combination thereof and may facilitate wired and/or wireless communications of information among devices and/or applications connected thereto.

The network may include a plurality of devices, which may be physical devices, virtual devices (e.g., applications running on physical devices that function similarly to one or more physical device), or some combination thereof. The devices within the network may include, for example, one or more of general purpose computing devices, specialized computing devices, mobile devices (e.g., cellular phones, tablets, laptop computers, personal digital assistants, smart watches and other wearable devices, augmented reality devices), wired devices, wireless devices, passive devices, routers, switches, mainframe devices, monitoring devices, infrastructure devices, servers, other devices configured to provide information to and/or receive information from one or more stakeholders, and software implementations of such.

For example, the network may include a plurality of mobile devices 10, which may each include one or more sensors, such as an integrated GPS device 12 and/or a camera 14. Such mobile devices 10 may include, for example, cellular phones, tablets, laptops, and other portable devices. Mobile devices 10 may be powered by a mobile operating system, such as Apple Inc.'s iOS® mobile operating system, Google Inc.'s Android® mobile operating system, or Microsoft Corporation's Windows® operating system, for example.

Moreover, the network may include a plurality of transportation devices, such as boats, buses, trucks, bicycles, motorcycles, airplanes, trains, and cars 20, for example. One or more of cars 20 may be network-connected and include one or more sensors, such as an integrated (or otherwise associated) GPS device 22 and, in some configurations, a camera 24, such as a rear-view camera, a side-view camera, and/or a dashboard camera, for example. The network may further include additional sensors, some of which may be stationary and some of which may be mobile, that perform one or more monitoring processes. Examples of such sensors may include a network-connectable camera 30 (e.g., a speed or red-light camera, a toll-booth camera, a security or surveillance camera) and a mobile camera 16 (e.g., a helmet cam, a wearable camera).

Devices within the network, such as mobile devices 10, cars 20, and other devices may include one or more applications that provide a user interface, which may display alerts, alarms, and/or notifications disclosed herein, and which may provide one or more options for addressing anomalies (e.g., notifying police, deactivating a vehicle or placing the vehicle in no-drive mode, deactivating another device, placing restrictions on one or more objects, or initiating auditing processes) identified in such alerts, alarms, and/or notifications.

The network also may include a plurality of servers 50 that may receive, store, and/or provision data within the network. For example, a server 50 store social information about a plurality of individuals (e.g., social network profiles, criminal history, associated groups or individuals, such as identification information for neighbors or friends, work history, hobbies, preferred eateries) and/or other objects (e.g., registry of object owners, a history of citations provided to automobiles, stolen car registries, police reports). Some servers 50 may store a history of motion data for various objects (e.g., average rates of speed on a particular road, typical patterns of object interaction within a geography, typical patterns and/or routs followed by stalkers or other pursuers). Certain servers 50 may store geographical information, such as maps of various geographies, arrangements of roads or sidewalks, predicted travel times, traffic patterns, traffic signal locations. Particular servers 50 may store images or videos, such as surveillance videos, images of cars (including license plates) that have run red lights, neglected to pay tolls, or were speeding. Such servers 50 may store many different types of information, including information that has not been explicitly described herein, for example. The information/data stored in servers 50 may be acquired from various sources, such as public records/databases, private records/databases, and/or various sensors and other devices (e.g., devices 10, 12, 14, 16, 20, 22, 24, 30, 60, 100) that provide information directly to servers 50. Mobile devices 10, car 20, mobile camera 16, camera 30 and other devices within the network may access information from one or more server 50.

The network may include a plurality of clients 60 that may obtain information from servers 50 and other devices within the network. Clients may communicate with, access, control, and/or provide information to other devices within the network. Clients 60 may be personal computers, other servers, mobile devices, printers, and/or any other type of network-enabled device. Mobile devices 10, car 20, mobile camera 16, camera 30 and other devices within the network may act as a client 60 in certain configurations.

The network may further include a system 100 that may implement one or more process of intelligent pursuit detection disclosed herein. System 100 may be an independent processing system as shown in FIG. 1 or may be integrated with another device within the network, such as one or more of devices 10, 12, 14, 16, 20, 22, 24, 30, 60, for example.

Figure 2:
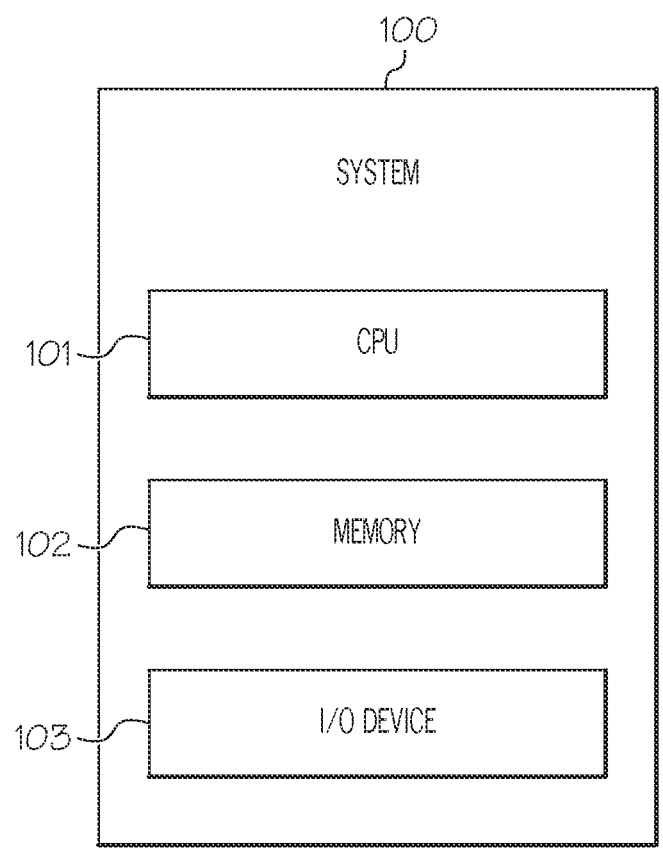
FIG. 2 is a schematic representation of a system configured to implement intelligent pursuit detection processing and/or other processes.

Referring to FIG. 2, system 100 is now described. System 100 may reside on one or more networks 1. System 100 may comprise a central processing unit ("CPU") 101, a memory 102, and an input and output ("I/O") device 103. Memory 102 may store computer-readable instructions that may instruct system 100 to perform certain processes. In particular, memory 102 may store a plurality of application programs and/or scripts. When computer-readable instructions, such as an application program or a script, are executed by CPU 102, the computer-readable instructions stored in memory 101 may instruct CPU 102 to perform a plurality of functions. Examples of such functions are described below with respect to FIGS. 4-7. One or more of devices 10, 12, 14, 16, 20, 22, 24, 30, 60 may be implemented or controlled by system 100 or another hardware system with similar components.

System 100 may be a server, a consumer device, a combination of a server and a consumer device, or any other device with the ability to collect and process data. System 100 may include a processing system comprising a single processor, such as CPU 102, a plurality of processors, and/or one or more application specific integrated circuits ("ASICs"), for example. In some configurations, processing system 100 may be implemented by an integrated device. In other configurations, processing system 100 may be implemented by a plurality of distributed systems residing in one or more geographic regions.

I/O device 103 may receive one or more of data from cloud 40, data from other devices and sensors connected to system 100, and input from a user, and I/O device 103 may provide such information to CPU 101. I/O device 103 may transmit data to cloud 40, may transmit data to other devices connected to system 100, and may transmit information to a user (e.g., display the information, send an e-mail, make a sound). Further, I/O device 103 may implement one or more of wireless and wired communication between system 100 and other devices within or external to cloud 40 or other networks.

Figure 3:
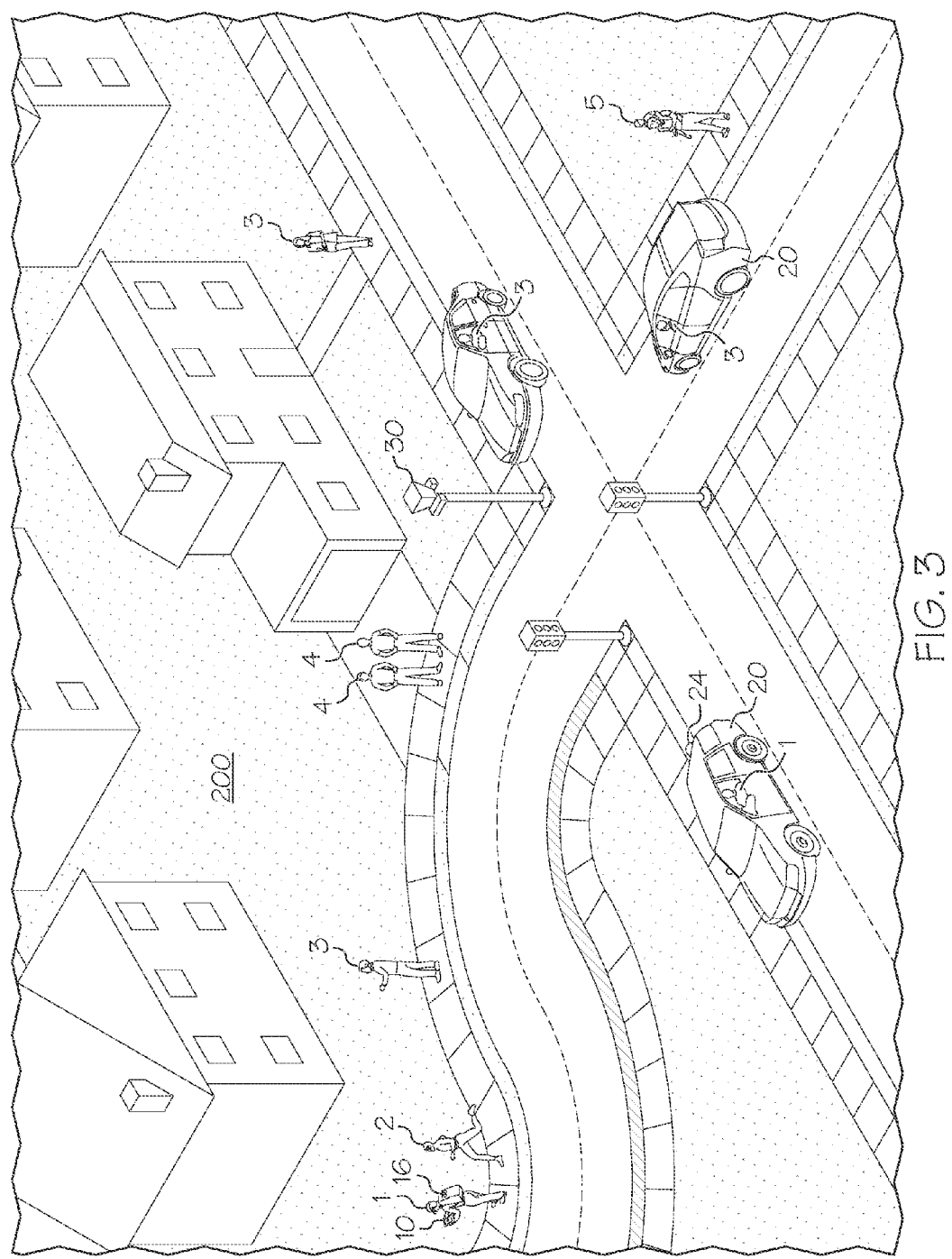
FIG. 3 is a schematic representation of a geography through which one or more objects may travel and within which intelligent pursuit detection may be implemented.

Referring to FIG. 3, a geography through which one or more objects may travel and within which intelligent pursuit detection may be implemented now is described.

FIG. 3 depicts a geography 200, which corresponds to a particular location. Geography 200 includes a number of transit paths, such as roads and sidewalks. A plurality of cars 20 may travel on the roads, and a plurality of individuals 1, 2, 3, and 5 may move on the sidewalks or in the cars 20. Certain individuals 4 may be stopped for a conversation and, consequently, not in motion. Cars 20, individuals 1, 2, 3, 4, 5, and mobile devices 10 may be non-limiting examples of objects described herein. As used herein, the term "object" may refer to individuals and other living things, devices, vehicles, machines, and any other tangible item that one of skill in the art would recognize as an object in accordance with known meanings of that term.

Geography 200 also includes an intersection with stoplights and a network-enabled camera 30 configured to record images of vehicles driving through the intersection. For example, camera 30 may be a read-light and/or speed camera configured to record an image of a vehicle's license plate number when the vehicle exceeds the speed limit or does not stop for a red light. In come configurations, camera 30 may even record an image of every vehicle that passes through the intersection. Camera 30 may associate a time-stamp with such images, so that the time at which a vehicle was located in the vicinity of the camera 30 may be stored for later analysis. In some configurations, camera 30 also may determine a speed and direction of travel for such vehicle and associate such information with the recorded image. In this manner, camera 30 may identify a particular vehicle, such as a car 20, based on the vehicle's identification number (e.g., license plate number) and obtain motion data (e.g., speed, direction, location at a particular time) corresponding to said vehicle. Moreover, camera 30 may, in some configurations, access a server 50 to obtain the identity of the vehicle's owner using the imaged license plate number and/or to determine whether the vehicle has been reported stolen or has received a substantial number of citations. In some configurations, geography 200 may include a plurality of cameras 30, such that the movement of vehicles from one location within geography 200 to another location within geography 200 may be tracked. While the foregoing example concerns a camera 30 that primarily monitors cars 20 and other automobiles, such a camera 30 may be configured to similarly monitor pedestrians, bicyclists, and other objects that pass by the camera. Moreover, camera 30 may be similarly disposed in another geography, such as within a store or shopping center, to monitor passersby in a similar fashion, for example.

In some configurations, devices other than a camera may be used to track the location, speed, direction, and identity of objects passing by (e.g., vehicles, pedestrians, mobile devices). For example, Bluetooth transmitters/receivers (e.g., such as those used in Apple Inc.'s iBeacon system), Wi-Fi transmitters/receivers (e.g., such as those using triangulation systems), strategically-placed NFC transmitters/receivers, cellular transmitters/receivers (e.g., also using triangulation systems), and/or a range of other devices may be used in place of or in addition to camera 30 (or in place of cameras 14, 16, and 24, which are described in more detail below) to capture motion data and identifying information about objects passing by.

As noted above, a plurality of cars 20 may be moving within geography 200. One or more of cars 20 may include one or more of a GPS device 12, which may track the position of that car 20, and a camera 24, which may monitor the surroundings of that car 20. In particular, the GPS device 12 may provide motion data of the car 20 in the form of position information for the car 20, speed of the car 20, and motion direction of the car 20. Further, camera 24 may obtain motion data of vehicles, individuals, and other objects within a particular distance of car 20 by recording images of such objects, and the recorded images may be analyzed to determine the identity/ownership of such vehicles, individuals, and other objects (e.g., via license plate numbers, information obtained from servers 50, and other identifying information) and to ascertain how such objects are moving through the geography. Such motion data may be relative motion data (e.g., motion of such objects relative to the car 200) or absolute motion data (e.g., relative motion data combined with the GPS information for the car 20). In some configurations, one or more camera 24 may be placed at the rear and/or sides of the car 20 to monitor objects directly pursuing the car 20 from behind and/or objects indirectly pursuing the car 20 via evasive routes, such as routes along parallel streets or alleys. As noted above, Bluetooth transmitters/receivers, Wi-Fi transmitters/receivers, strategically-placed NFC transmitters/receivers, cellular transmitters/receivers, and/or a range of other devices may be used in place of or in addition to camera 24 to capture motion data and/or identification information corresponding to other objects in proximity to car 20, for example. Moreover, camera 24 may be replaced by and/or supplemented with a proximity sensor, for example.

As also noted above, a plurality of individuals 1, 2, 3, 4, and 5 may be disposed within geography 200. Individuals 1, such as the individual 1 in car 20 or the pedestrian individual 1 carrying a mobile device 10 may worry about being pursued. Such individuals 1, for example, may be carrying valuable goods, may have concerns about crime levels, may be elderly or frail, may be celebrities or public personalities, may have received threats, or may otherwise have concerns about being followed and/or harmed. Individual 2 may be a pursuer of the pedestrian individual 1 with ill intent, such as a stalker or a robber, for example. Individual 3 may merely be another individual following the same sidewalk as the pedestrian individual 1. Individuals 4 may merely be other individuals that have stopped for a conversation on the same sidewalk used by the pedestrian individual 1. Individual 5 may be a pursuer of the individual 1 in car 20, and the individual 5 may currently be taking evasive measures to avoid detection by the individual 1 in car 20.

As noted above, the pedestrian individual 1 may carry a mobile device 10, such as a cellular phone, for example. The mobile device 10 may include a GPS device 12 and a camera 14, for example. GPS device 12 and camera 14 may perform functions similar to those of GPS device 22 and camera 24 described above, except that GPS device 12 and camera 14 may respectively capture motion data for mobile device 10 (and also individual 1, whose motion generally may be coincident with mobile device 10) and other objects within a particular distance from mobile device 10 (e.g., individuals 2, 3, 4, and 5 and cars 20). In some configurations, camera 14 may further capture identification information for such other objects within the particular distance from mobile device 10. In certain configurations, camera 14 may be a screen-mounted camera that may record images of objects behind individual 1 while individual 1 is viewing mobile device 10's screen. In some configurations, camera 14 may be a rear-mounted camera that may record images of objects to the side of or behind individual 1 while individual 1 is holding mobile device 10 to his/her head. In further configurations, individual 1 may be equipped with a mobile camera 16 that may be selectively mounted on individual 1's person to more-effectively record images of object behind and/or to the sides of individual 1. Mobile camera 16 may be a wearable camera, for example, which may be placed on individual 1's backside or sides. Moreover, mobile camera 16 may perform functions similar to those of camera 14 described above. As noted above, Bluetooth transmitters/receivers, Wi-Fi transmitters/receivers, strategically-placed NFC transmitters/receivers, cellular transmitters/receivers, and/or a range of other devices may be used in place of or in addition to cameras 14 and/or 16 to capture motion data and/or identification information corresponding to other objects in proximity to pedestrian individual 1, for example. Moreover, cameras 14 and/or 16 may be replaced by and/or supplemented with a proximity sensor, for example.

Consequently, one or more of cameras 14, 16, 24, and 30 may capture motion data and/or identification information of one or more of cars 20 and/or one or more of individuals 1, 2, 3, 4, and 5, for example. As described above, one or more of cameras 14, 16, 24, and 30 may by oriented to face behind and/or to the side of car 20 and/or individual 1 to assist in identifying pursuers that are following such car 20 and/or individual 1. Nevertheless, certain evasive pursuers may utilize alternative routes and/or actually travel in front of car 20 and/or individual 1 in scenarios where such pursuers know car 20 and/or individual 1's travel path with sufficient likelihood (e.g., where the geography has a low entropy, where car 20 and/or individual 1's likely next pivot-point and/or destination is known). In such scenarios, it may be effective to arrange one or more of cameras 14, 16, 24, and 30 in a forward-facing manner, so that such camera(s) may identify whether a potential pursuer is travelling in front of car 20 and/or individual 1.

Geography 200 may be characterized using the concept of "entropy of geography" (also referred to as "entropy of the neighborhood"). As used herein, the term "entropy of geography" serves as a measure of the number of possible routes for an object within a geographical region. Entropy of geography may gauge an amount of disorder (e.g., a number of paths/routes) within a geographic region, for example. For example, a geographical region including only a toll road with few exits may have a low entropy of geography (for motor vehicle transportation) because cars traveling on the toll road will be forced to follow a designated path with few options to deviate from the path. Consequently, a pursuer may not need to follow car 20 and/or individual 1 closely within a geography having a low entropy, as such car 20 and/or individual 1's path may be easily predicted. Thus, motion data corresponding to other objects within a geography having a low entropy may be less useful in identifying a pursuer.

Conversely, a geographical region, such as a city, may contain numerous streets that twist, wind, and interconnect, such that it is easy for car 20 and/or individual 1 to quickly change its route and avoid a pursuer. Consequently, because cars travelling through a city may have many path options, such a geographical region including numerous streets that twist, wind, and interconnect may have a high entropy of geography (for motor vehicle transportation). In geographies with a high entropy of geography, pursuers must therefore follow car 20 and/or individual 1 closely. Thus, motion data corresponding to other objects within a geography having a high entropy may be very important in identifying a pursuer.

In some configurations, entropy of geography may be used to generally characterize routes available within a geography using all means of transportation/motion (e.g., by motor vehicle, by train, by boat, by walking, by bus). In other configurations, each means of transportation/motion within a geography may have its own entropy of geography. For example, a city may have a high entropy of geography for both walking and driving, whereas a rural geography with a toll road surrounded by woods may have a low entropy of geography for driving but a high entropy of geography for walking because there may be many possible foot routes through the surrounding woods. The entropy of a geography may be determined from geographical information available from one or more servers 50 (e.g., map information, survey data) and/or derived from information collected by sensors (e.g., derived from the images recorded by one or more of cameras 14, 16, 24, and 30; derived from the GPS data received from a plurality of GPS devices, such as GPS devices 12 and 22).

Figure 4:
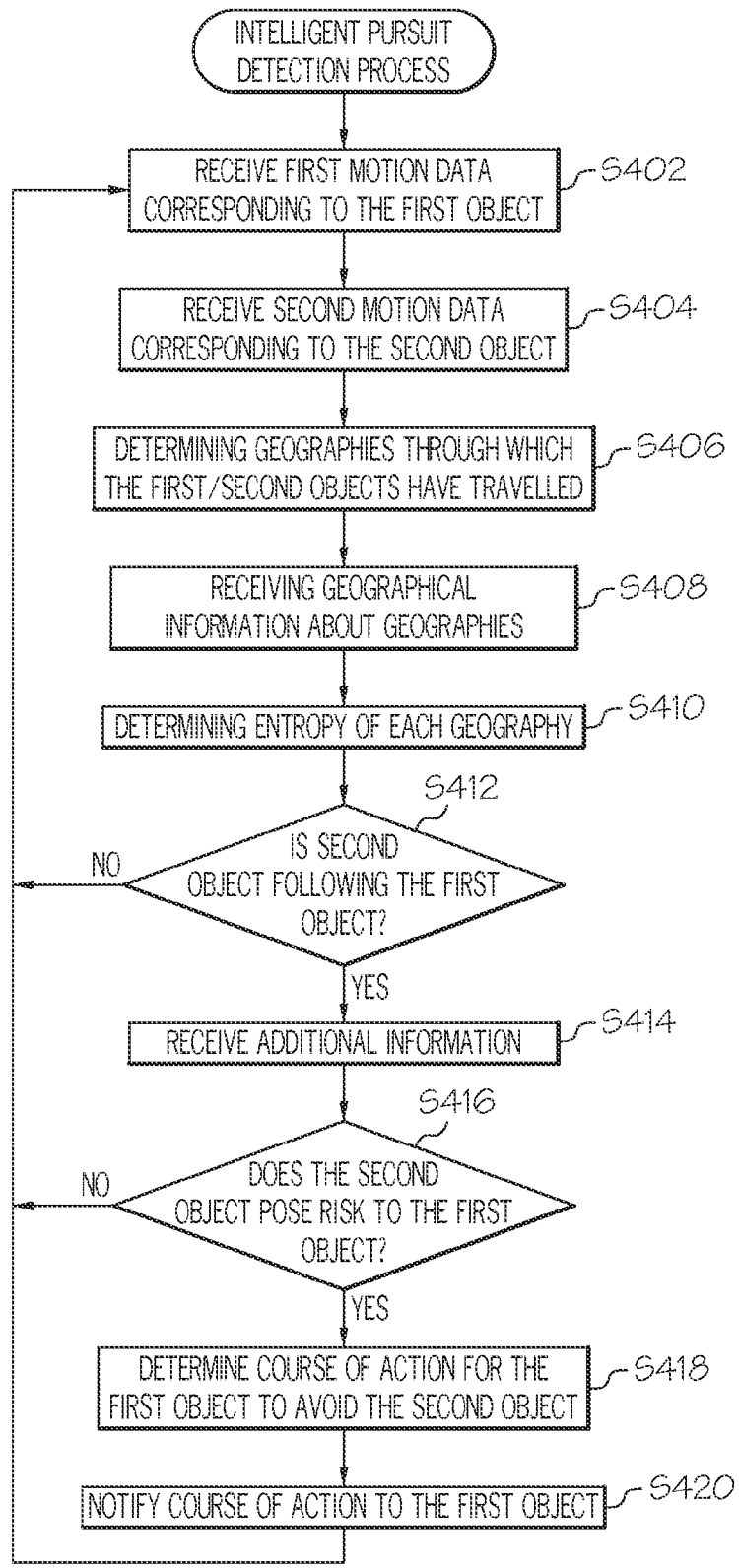
FIG. 4 illustrates a process of intelligent pursuit detection.

Referring to FIG. 4, a process of intelligent pursuit detection now is described. As described above, the process of intelligent pursuit detection may be performed by and/or controlled by system 100 (e.g., via a processing system thereof), which may be integrated with and/or independent from one or more of mobile device 10, camera 16, car 20, camera 30, server 50, client 60, and other devices within cloud 40, for example. The process of intelligent pursuit detection may help individuals 1 proactively determine whether they are being followed, whether such a follower poses a threat, and a method for avoiding a threatening follower (e.g., losing the follower, hiding, obtaining assistance from others, taking evasive actions, alerting the police to detain the follower).

In S402, system 100 may receive first motion data corresponding to a first object. Returning to the example of pedestrian individual 1, system 100 may obtain (e.g., receive) GPS data (e.g., first motion data) corresponding to mobile device 10 (and also to the pedestrian individual 1 that is carrying mobile device 10) (e.g., mobile device 10 and individual 1 are both examples of a first object in this example configuration). The obtained GPS data may provide (or readily allow for determination of) the position, speed, and direction of the first object at a plurality of different times, for example. In some configurations, the GPS data may be obtained from GPS device 12. In other configurations, the GPS data may be obtained from an information store, such as a server 50, that stores GPS data received from GPS device 12.

In the example with an individual 1 in a car 20, a similar process may occur in S402. More particularly, system 100 may obtain (e.g., receive) GPS data (e.g., first motion data) corresponding to car 20 (and also to the individual 1 therein) (e.g., car 20 and individual 1 are both examples of a first object in this example configuration). The obtained GPS data may provide (or readily allow for determination of) the position, speed, and direction of the first object at a plurality of different times, for example. In some configurations, the GPS data may be obtained from GPS device 22. In other configurations, the GPS data may be obtained from an information store, such as a server 50, that stores GPS data received from GPS device 22.

In S404, system 100 may receive second motion data corresponding to a second object. Returning to the example of pedestrian individual 1, system 100 may obtain (e.g., receive) motion data (e.g., second motion data) corresponding to objects (e.g., each such object being an example of a second object) within a particular distance (e.g., a resolvable distance for the sensor, a predefined distance) of the sensor (e.g., camera 14, camera 16, camera 24, camera 30, supplemental sensors, alternative sensors such as the receiver/transmitter systems described above). Such motion data may be raw image data received from one or more of cameras 14, 16, 24, 30, for example, and may be further processed by system 100 (or another processing system) to provide the position, speed, and direction of the second object at a plurality of different times. In some configurations, the motion data may be pre-processed and may directly provide the position, speed, and direction of the second object at a plurality of different times. In certain configurations, system 100 may receive the second motion data from the sensor. In other configurations, system 100 may receive the motion data from an information store, such as a server 50, which stores and/or pre-processes the motion data output by the sensor. In the example with an individual 1 in a car 20, a similar process may occur in S404.

In S406, system 100 may determine the geographic region(s) (e.g., the geography/geographies) through which one or more of the first object and the second objects have travelled. In some configurations, it may be sufficient to determine only the geographic regions through which the individual 1 has travelled without determining the geographic regions through which other objects have travelled, as the geographic regions through which the individual 1 has travelled will often control/limit the ability of a pursuer to take evasive action. For example, system 100 may determine the geography/geographies through which the individual 1 has travelled based on the GPS data received from GPS device 12 or GPS device 22. In some configurations, system 100 may determine the geography/geographies through which the individual 1 has travelled based on information received from other sensors, such as images received from one or more of cameras 14, 16, 24, and 30.

In S408, system 100 may receive geographical information about each geography identified in S406. For example, system 100 may access one or more servers 50 to obtain map data (e.g., as the geographic information) for each geography identified in S406. In some configurations, system 100 may determine the geographic information for each geography identified in S406 information received from other sensors, such as images received from one or more of cameras 14, 16, 24, and 30. In certain configurations, this may be crowd-sourced data. The geographical information may identify features, such as one or more of roadways, buildings, landmarks, waterways, sidewalks, traffic signals, highways, toll roads, bridges, forests, farms, and other physical aspects of the respective geographies.

In S410, system 100 may determine the entropy of each geography identified in S406 based on the geographical information. In some configurations, system 100 may determine a generalized entropy of each geography based on a plurality of travel methods (e.g., walking, motor vehicle transport, cycling). In other configurations, system 100 may determine a distinct entropy of each geography for each travel method (e.g., an entropy of a geography for walking, an entropy of a geography for travelling by motor vehicle, an entropy of a geography for cycling). As noted above, the entropy of a geography may be based on the number of different routes available for travelling through the geography.

In S412, system 100 may determine whether a second object appears to be following the first object. For example, system 100 may determine whether one or more of individuals 2, 3, 4, and 5 and/or one or more of cars 20 is following an individual 1. In particular configurations, the determination in S412 may be based on the amount of correlation between the first motion data of the first object and the second motion data of the second object. For example, if there is 100% correlation between the first motion data of the first object and the second motion data of the second object, there may be a strong likelihood that the second object is following the first object. Conversely, if there is 0% correlation between the first motion data of the first object and the second motion data of the second object, there may be a low likelihood that the second object is following the first object. In some instances, a predetermined level of correlation may be established as a threshold to determine whether following is occurring. The predetermined level may be based on the behavior of other objects, the past behavior of the objects being monitored, and/or the geography, for example.

Further, the determination in S412 may include additional complexity. For example, correlated motion data for only a short period of time (e.g., 10 seconds) may not indicate a high likelihood of being followed in and of itself. Such following behavior may not be notable unless it is systematic and sustained (e.g., 15 minutes of correlated motion). Consequently, system 100 may require that the first motion data and the second motion data are sufficiently correlated for at least a predetermined period of time and/or that such motion data shows at least a predetermined number of instances of correlation within the predetermined period. Moreover, in certain configurations, system 100 also distinguishes between the second object following the first object and the first object following the second object. For example, when the first object is following the second object the first motion data and the second motion data may be substantially correlated, but such correlation alone would not be a proper indicator that the second object is following the first object. Accordingly, system 100 may further utilize sensor information (e.g., orientation information from cameras 14, 16, 24, 30) to distinguish between the first object following the second object (e.g., typically acceptable behavior wherein the concerned individual 1 corresponds to the first object) and the second object following the first object (e.g., worrisome behavior wherein the concerned individual 1 corresponds to the first object).

In some implementations, system 100 may analyze the motion data to identify patterns of repeated motions over time. For example, individuals 4 may walk along the sidewalk in geography 200 and stop at the same spot for a conversation every day. Such individuals 4, however, may repeatedly walk to and stop at the same spot only when pedestrian individual 1 comes into their field of view. Once pedestrian individual 1 walks by and exits the field of vie of individuals 4, individuals 4 may leave the spot and walk away. Consequently, while the individuals 4 are not necessarily following pedestrian individual 1, such individuals 4 may be engaged in repeated activity that is highly correlated with the presence of pedestrian individual 1. Therefore, in such configurations, system 100 may determine that individuals 4 are "following" pedestrian individual 1 (S412: YES), even though individuals 4 are merely lingering while pedestrian individual 1 walks by.

In other configurations, system 100 may determine that a second object is following the first object (S412: YES) when the second object is persistently (e.g., with at least a particular frequency or duration) located near (e.g., within a particular distance of) the first object. In such configurations, system 100 may use the first motion data of the first object and the second motion data of the second object (e.g., GPS data) to track the relative positions of the first object and the second object over time. Generally, in such configurations, the longer the period of time that the first object and the second object are within the same proximity to one another, the more likely that the system will determine that the second object is following the first object. Nevertheless, exceptions to this general rule may exist.

In any event, when system 100 determines that the second object is following the first object (S412: YES), the process may proceed to S414. Conversely, when system 100 determines that the second object is not following the first object (S412: NO), the process may return to S402 and receive additional motion data. The process of determining whether the second object is following the first object is described below in more detail with respect to FIG. 5, which shows an example process of making such a following determination.

In S414, system 100 may receive additional information from an external source. For example, the additional information may be identity information for the second object, such as information about the owner of a car 20 whose license plate number was imaged with one or more of cameras 14, 16, 24, and 30, for example. In some configurations, system 100 may query an external database on a server 50, for example, to look up owner information associated with an imaged license plate. In certain configurations, the additional information may be social information about the second object (or the second object's owner/master), such as a reputational history (e.g., a criminal record, a listing of citations or tickets, a history of fraud, ownership of weapons, listed on an offender registry, other background information), identities of friends, neighbors, coworkers, family, and/or other acquaintances, and employment information for example. In some configurations, such additional information may be collected for all objects within a particular distance of the first object. Such additional information may be obtained from a plurality of public and/or private sources hosted on one or more servers 50, for example.

In certain configurations, the additional information may include information identifying one or more patterns of correlated motion that is often associated with (e.g., is an indicator of) malicious activity (e.g., stalking, robbery, assault, theft). Such information may likewise be received from an external server 50, for example, and may be based on one or more of existing knowledge in the field, data aggregated from one or more components described herein, one or more expert systems, and/or a plurality of other sources.

In some configurations, the additional information may include the motion data to a plurality of other objects (e.g., other than the first object and the second object) in the same geography as, within a particular distance of, having similar attributes to, or otherwise having some relation to one or more of the first and second objects. Such motion data may be received from an external source, such as a server 50, or another source, such as one or more of the sensors described above (e.g., a GPS device, one or more of cameras 14, 16, 24, and 30, one or more of the transmitters/receivers described above). For clarity, such sensors may be considered as sources different from the first object and the second object, even if such sensors are integrated or otherwise disposed with the first object and/or the second object.

In some configurations. S414 may be performed prior to the determination in S412. In other configurations, S414 may be performed in response to a positive determination (S412: YES) in S412. Such responsive performance of S414 may conserve system resources by only collecting the additional information as needed.

In S416, system 100 may determine whether the second object poses a risk to the first object. More specifically, in response to determining that the second object is following the first object, system 100 may evaluate the additional information and, in some configurations, the first and second motion data to determine whether the second object poses a risk to the first object. Such a risk may be associated with physical and/or financial harm, for example. Less scrupulous and more unsavory individuals and other objects may likely pose a greater risk than upstanding individuals that are well-respected and have great reputations. While the determination in S416 may be somewhat qualitative in nature, quantifiable thresholds may be established to determine what combination of additional information signals greater risk and what level of risk is acceptable.

For example, if the additional information indicates that the second object is (or is associated with) an individual, such as individual 2, with a criminal history or a history of citation, system 100 may determine that the second object likely poses a risk to the first object. Similarly, if a social profile associated with the second object (and provided as part of the additional information) identifies a history of threatening behavior, system 100 may determine that the second object likely poses a risk to the first object. Conversely, if the additional information indicates that the second object is (or is associated with) an individual that is a relative of, friends with, and/or a coworker of the first object or an individual associated with the first object, system 100 may determine that the second object likely does not pose a risk to the first object. Similarly, if the additional information indicates that the second object is (or is associated with) an individual that does not have a criminal record or a history of citation, system 100 may determine that the second object likely does not pose a risk to the first object. Many factors may be considered when making the determination in S416, such as social relationships, reputation, the environment, the activity, and a slew of other factors.

In some configurations, system 100 may use the motion data of the first and second objects when determining whether the second object poses a risk to the first object. For example, the second object may be rapidly approaching the first object and then backing away when the first object turns around. Such motion may be suggestive of evasive behavior, which itself may suggest a malicious intent to conceal the presence of the second object. Consequently, system 100 my determine that the second object poses a risk to the first object when one or more of the first motion data and the second motion data indicates suspicious movement patterns in addition to mere following behavior.

In other configurations, system 100 may use the time of the determined following when determining whether the second object poses a risk to the first object. For example, it may be common for many people to repeatedly commute to work along the same routes on weekday mornings. Consequently, if such following only tends to occur during rush hour, such following may be innocent. Nevertheless, if the first object performs the commute at an unusual or unexpected time (e.g., on the weekend, in the afternoon) and the second object still engages in the following, system 100 may determine that the second object is engaging in malicious following and poses a threat to the first object.

In any event, when system 100 determines that the second object poses a risk to the first object (S416: YES), the process may proceed to S418. Conversely, when system 100 determines that the second object does not pose a risk to the first object (S416: NO), the process may return to S402 and receive additional motion data. The process of determining whether the second object poses a risk to the first object is described below in more detail with respect to FIGS. 6 and 7, which show example processes of making such a risk determination.

In S418, system 100 may determine a course of action for the first object to avoid the second object. For example, system 100 may retrieve the phone number for the police or even automatically notify the police of the threat posed to the first object. In some configurations, system 100 may generate an evasive route that will assist the first object sneak away from the second object. In other configurations, system 100 may generate a route that will take the first object through public spaces where it is unlikely that the second object would harm the first object. In certain configurations, system 100 may generate a route to a place with help, such as a police station or even a gas station. In still other configurations, system 100 may generate a message asking if an alarm should be sounded or, in the alternative, may sound an alarm. In further configurations, system 100 may generate a message telling the first object to move hurriedly away (e.g., run, drive quickly) or to seek help. More generally, system 100 may access a plurality of internal and/or external resources and use such resources to develop one or more strategies for the first object to avoid the risky second object.

In S420, system 100 may provide the first object with the course of action. For example, system 100 may transmit one or more of the above-described routes, messages, and phone numbers to an individual 1's mobile device 10 and/or car 20, which may cause a display on mobile device 10 and/or car 20 to display such routes, messages, and phone numbers to individual 1 or to otherwise notify individual 1 that the police or other help has been contact and/or that an alarm has sounded. Moreover, system 100 may cause such display(s) to notify the individual 1 of the risk posed by the second object and provide one or more known pieces of information about the second object (e.g., identification information, one or more piece of the additional information, a current location of the second object, an estimated time for the second object to reach the first object). In this manner, the first object may be made aware of the risk posed by the second object and of potential courses of action for avoiding the second object. Following S420, the process may return to S402 and receive additional motion data.

As an example, system 100 may receive motion data regarding pedestrian individual 1 in S402 and regarding the other individuals 2, 3, 4, and 5 and cars 20 in S404. System 100 may determine that the motion of individuals 2 and 3 is sufficiently correlated (e.g., meets some threshold correlation criteria) with the motion of pedestrian individual 1 and that the motion of individuals 4 and 5 is not sufficiently correlated with the motion of pedestrian individual 1. Consequently, system 100 may determine that individuals 2 and 3 are following pedestrian individual 1 (S412: YES) and that individuals 4 and 5 are not following pedestrian individual 1 (S412: NO). Thereafter, system 100 may obtain additional information about individuals 2 and 3 from a server 50 or other source (e.g., sensors associated with individuals 2 and 3, other sensors, other databases) in S414. The additional information may indicate that individuals 3 have no criminal records and are actual pedestrian individual 1's neighbors. The additional information also may indicate that geography 200 is pedestrian individual 1's neighborhood. Moreover, the additional information may indicate that individual 2 is a hardened criminal with a grudge against pedestrian individual 1 (e.g., individual 2 has made negative social network posts about pedestrian individual 1, pedestrian individual 1 has reported individual 2 to the police before). Consequently, system 100 may determine that individuals 3 do not pose a risk to pedestrian individual 1 (S416: NO) but that individual 2 poses a risk to pedestrian individual 1 (S416: YES).

In response to determining that individual 2 poses a risk to pedestrian individual 1 (S416: YES), system 100 may retrieve the phone number for the police and generate a safe route through highly-visible public space in S418, which may help keep pedestrian individual safe from individual 2. Thereafter, system 100 may provide the police phone number with an alert of the threat to pedestrian individual 1's mobile device 10. The alert may further cause mobile device 10 to display the suggested safe route. In some configurations, the alert may control a display on mobile device 10 to show a real-time map with the locations of the mobile device 10 and the malicious individual 2 highlighted so that the pedestrian individual 1 may know the relative location of the malicious individual 2 in real-time and take evasive action.

In some cases, the alert may also provide pedestrian individual 1 with an option to inform system 100 that a false positive determination has been made. For example, pedestrian individual 1 may indicate that individual 2 is actually a friend, or that individual 2 is an unrelated delivery person, for example. In this way, system 100 may learn about false positives and revise its internal model to be more accurate (e.g., adjust the predetermined thresholds and/or criteria for following and/or risk determinations).

In certain configurations, system 100 also may broadcast an alert regarding the presence of the malicious individual 2 to other mobile devices in the area belonging to other individual so that the other individuals may help the pedestrian individual 1 and/or take measures to avoid and/or subdue the malicious individual 2.

Figure 5:
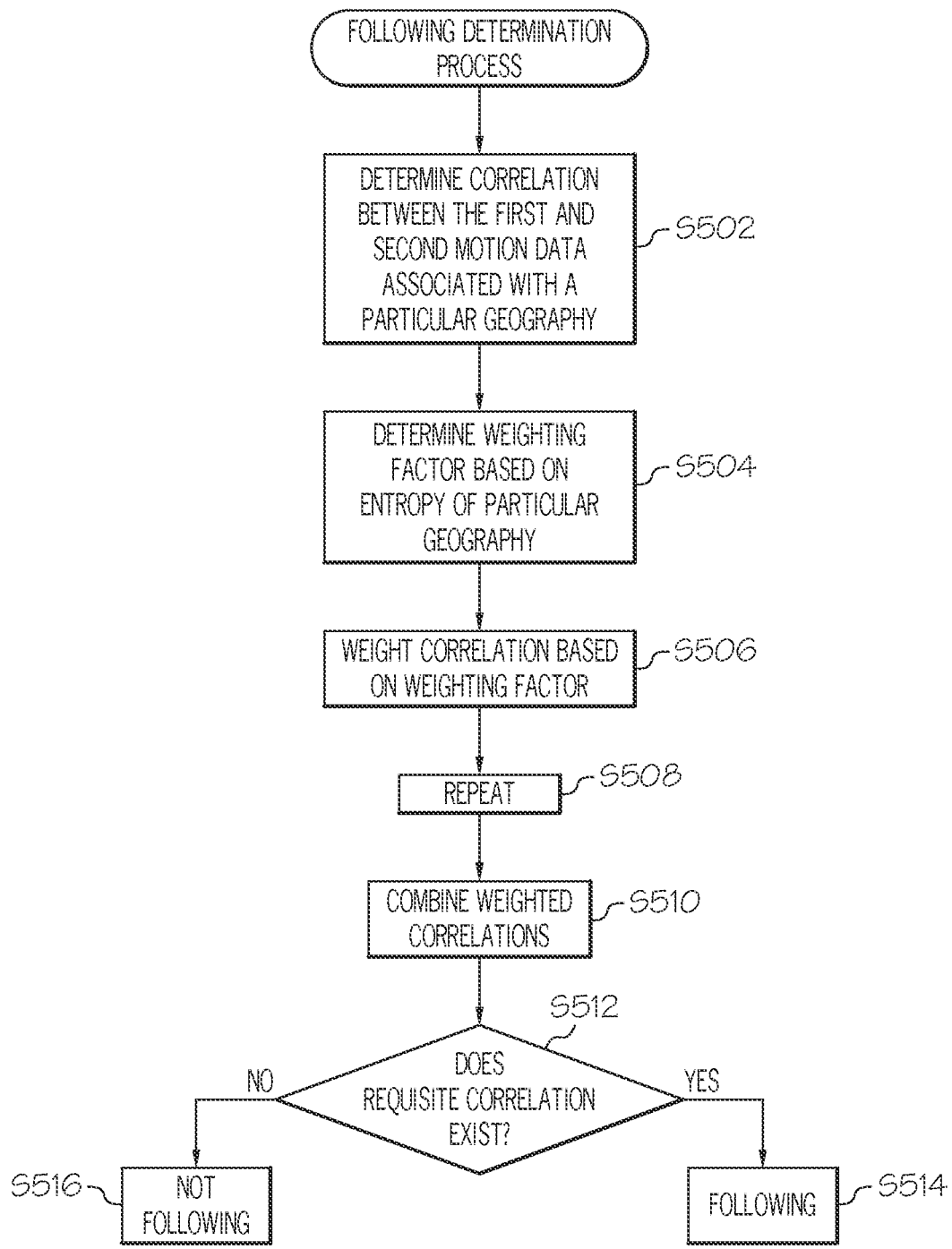
FIG. 5 illustrates a process of determining whether an object is being followed by another object.

Referring to FIG. 5, a process of determining whether an object is being followed by another object now is described. The process of FIG. 5 may utilize the entropy of each geography determined in S410. For purposes of illustration, the process of FIG. 5 is described with respect to motor vehicles and a single method of transportation (e.g., driving). Nevertheless, such process may similarly be performed with regard to other methods of transportation (e.g., walking, cycling, boating, public transit) and with regard to a combination of transportation methods (e.g., a combined entropy of the geography).

In S502, system 100 may identify portions of the first and second motion data that are associated with a particular geography. For example, system 100 may identify all motion data for a first car 20 (e.g., the car 20 with individual 1 therein) that occurred in geography 200. System 100 may also identify all motion data for a second car 20 that occurred while first car 20 was in geography 200. Thereafter, system 100 may determine the correlation between the identified motion data for the first car 20 and the identified motion data for the second car 20. Such correlation may be associated with the geography 200.

In S504, system 100 may use the entropy of the geography 200, which was determined in S410, to establish an entropy-based weighting factor. If the entropy of geography 200 is higher (e.g., many interconnected routes exist in the geography), system 100 may establish a heavier (e.g., greater) entropy-based weighting factor. If the entropy of geography 200 is lower (e.g., few interconnected routes exist in the geography), system 100 may establish a lighter (e.g., less) entropy-based weighting factor.

In S506, system 100 may apply the weighting factor determined in S504 to the correlation associated with the geography 200. For example, if the entropy of geography 200 was higher, system 100 may ultimately assign a heavier weight to the correlation associated with the geography 200. If the entropy of geography 200 was lower, system 100 may ultimately assign a lighter weight to the correlation associated with the geography 200.

More specifically, if the first car 20 and the second car 20 were travelling on a toll road with no exits, the motion data for the first and second cars 20 would be highly correlated. Nevertheless, because such a geography would have low entropy, the weighting factor assigned to such correlation would be very low. In this manner, system 100 may reduce the likelihood that low-entropy geographies will skew the determination that a second object is following the first object and creating false positives. Moreover, this approach also reduces the likelihood that evasive maneuvers taken by a pursuer in such a geography (e.g., where the pursuer is not very concerned about losing track of the first object) will skew the determination in the other way and create a false negative. More simply, the foregoing approach leverages the knowledge that motion in low-entropy geographies is much less important to a following determination than motion in higher-entropy geographies.

In S508, system 100 may repeat processes S502, S504, and S506 a plurality of times for a plurality of different geographies through which the first and/or second object travelled. In this manner, system 100 may generate a plurality of weighted correlation values.

In S510, system 100 may combine the weighted correlation values for the different geographies. Such combination may be a mathematical operation that results in a resultant correlation value. Thereafter, system 100 may proceed to S512 and compare the resultant correlation value with a predetermined level of correlation set as a threshold. If system 100 determines that the resultant correlation exceeds the threshold (S512: YES), system 100 may proceed to S514 and determine that the second object is following the first object (e.g., a determination that the second car 20 is following the first car 20. If system 100 determines that the resultant correlation does not exceed the threshold (S512: NO), system 100 may proceed to S516 and determine that the second object is not following the first object (e.g., a determination that the second car 20 is not following the first car 20.

While FIG. 5 shows an example method of determining whether a second object is following a first object, such example is merely one of a plurality of possible ways to make the following determination disclosed herein. Therefore, it should be appreciated that the following determination should is not limited to the method of FIG. 5.

Figure 6:
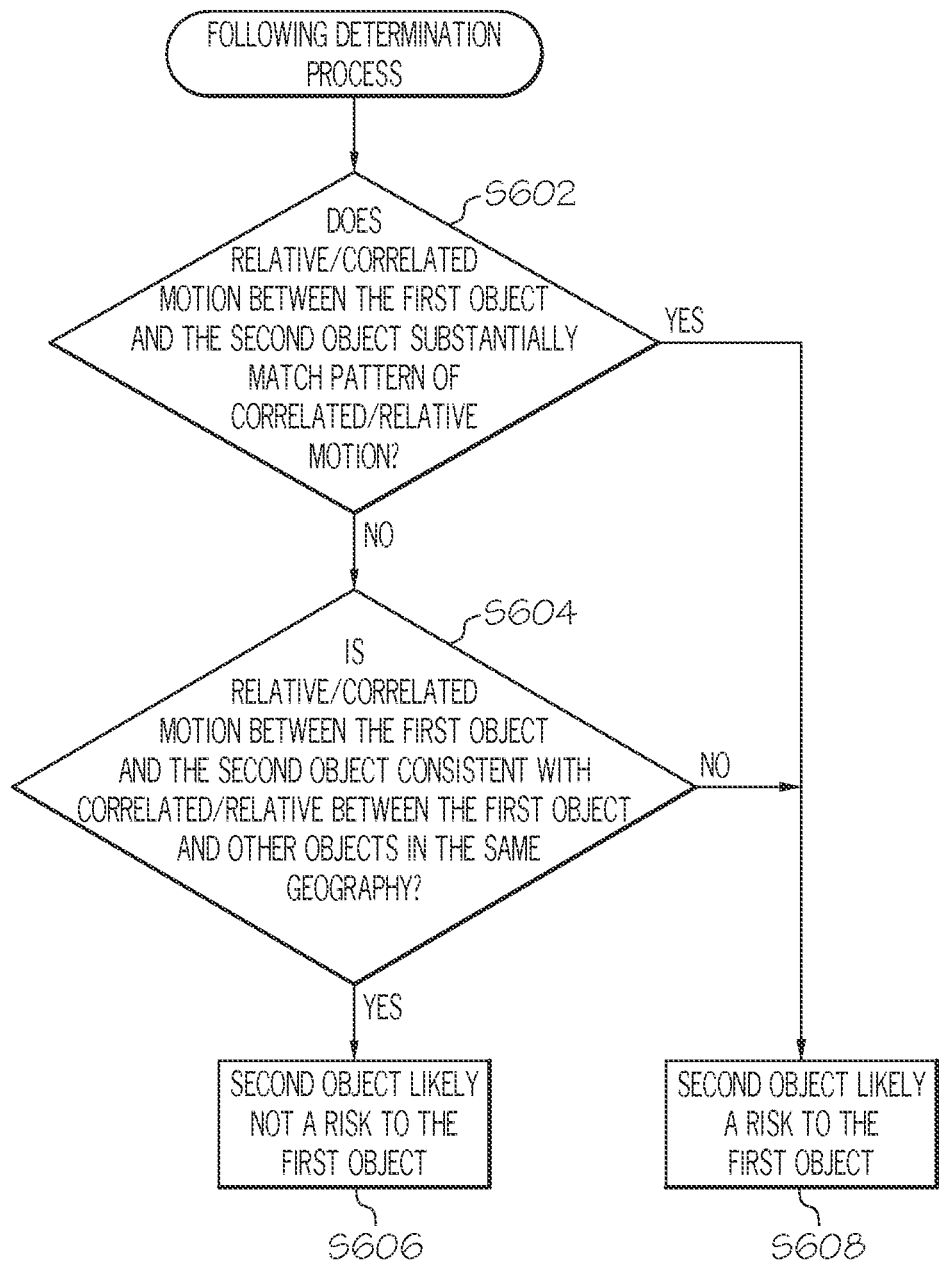
FIG. 6 illustrates a risk determination process.

Referring to FIG. 6, a process of determining risk now is described. The process of FIG. 6 may be performed as a response to determining that a second object is following the first object. By accurately determining whether the second object poses a risk to the first object, system 100 may prevent false-positives and reduce waste associated with implementing strategies to avoid second objects that are not threats to the first object.

In S602, system 100 may determine whether relative patterns of motion and/or patterns of correlation between the first object and the second object substantially match patterns known to correlate to threats. For example, as described above with respect to FIG. 4, known patterns of evasive motion may be highly correlated with risky/threatening behavior. Consequently, system 100 may compare the first and second motion data with such known patterns and determine an amount of correlation between the motion of the second object (or the motion of the second object relative to the first object) and such patterns of evasive motion. If the motion of the second object substantially matches one or more patterns of evasive action (e.g., the correlation exceeds some predetermined threshold), system 100 may make a positive determination in S602 (S602: YES) and proceed to S608. If the motion of the second object does not substantially match one or more patterns of evasive action (e.g., the correlation does not exceed some predetermined threshold), system 100 may make a negative determination in S602 (S602: No) and proceed to S604.

In S604, system 100 may use motion data of other objects collected from one or more servers 50 and/or one or more sensors, such as the sensors disclosed herein, for example, to determine baseline levels of behavior for objects within particular geographies and/or at particular times. For example, erratic motions toward or away from other objects may be entirely common behavior in some geographies or at certain times (e.g., during rush hour in a city). Moreover, being in close proximity with another object may be completely aberrant behavior in some geographies or at certain times (e.g., in the country at night). Thus, system 100 may establish baseline behaviors for different geographies at different times and compare the behavior (e.g., based on the first and second motion data) of the second object with such baselines. If the behavior of the second objects deviates from the established baseline by more than a predetermined amount, system 100 may determine that the behavior of the second object is inconsistent with the behavior of other objects in the vicinity of the first object and make a negative determination in S604 (S604: NO). After system 100 makes a negative determination in S604 (S604: NO), the process may proceed to S608. If the behavior of the second objects deviates from the established baseline by less than the predetermined amount, system 100 may determine that the behavior of the second object is consistent with the behavior of other objects in the vicinity of the first object and make a positive determination in S604 (S604: YES). After system 100 makes a positive determination in S604 (S604: YES), the process may proceed to S606.

S602 and S604 may be performed independently of one another or together in any order. In some configurations, a positive determination in both S602 and S604 may be required to proceed to S608 and determine that the second object is likely a risk to the first object. In certain configurations, further risk criteria may be evaluated, and, in some such configurations, still further risk criteria may need to be evaluated positively to proceed to S608 and determine that the second object is likely a risk to the first object.

In S606, system 100 may determine that the second object is likely not a risk to the first object. In S608, system 100 may determine that the second object likely is a risk to the first object.

Figure 7:
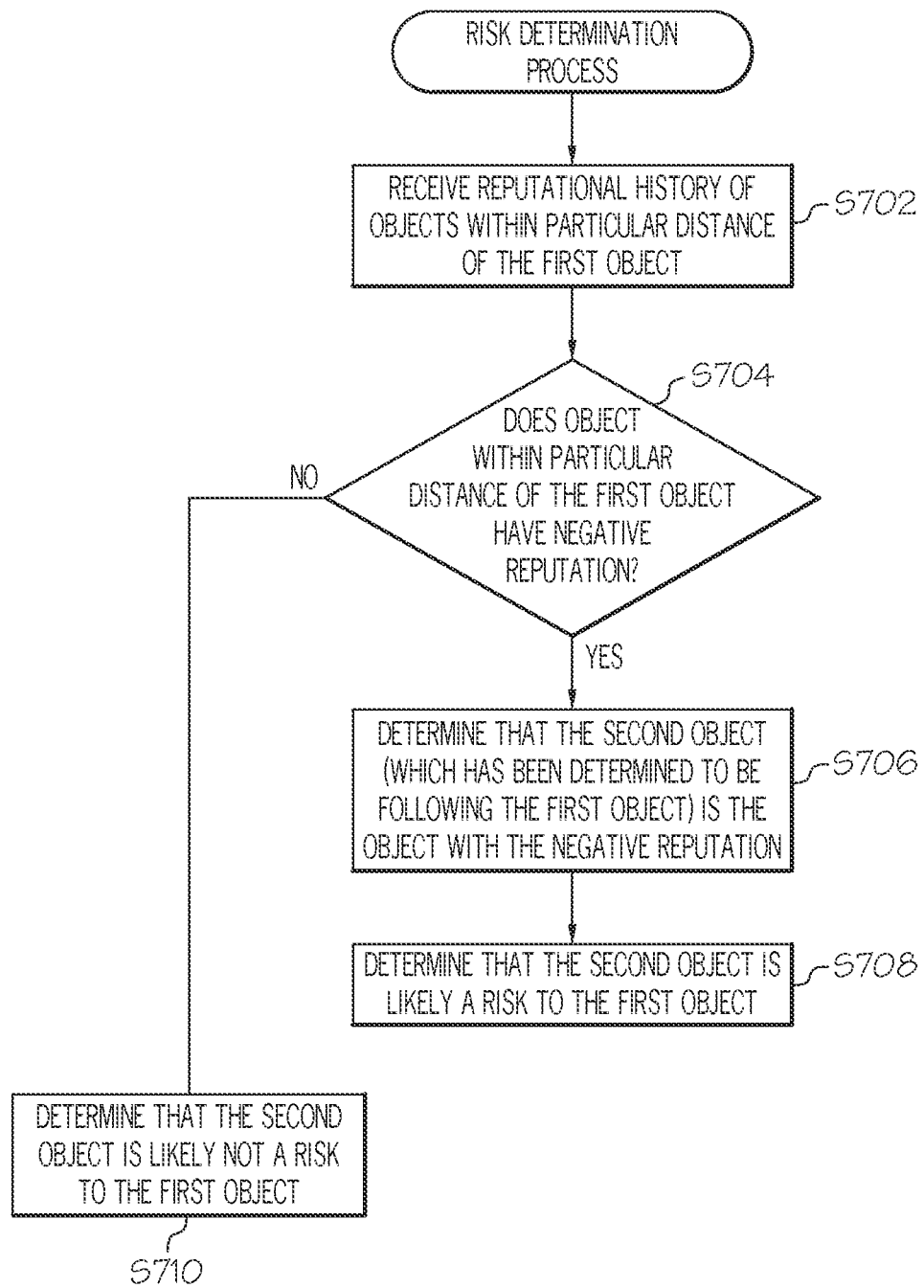
FIG. 7 illustrates another risk determination process.

Referring to FIG. 7, another process of determining risk now is described. The process of FIG. 7 identifies the presence of a risky object in the vicinity of the first object but does not necessarily establish a definitive link between the second object that is following the first object and the risky object. More specifically, the process of FIG. 7 utilizes the following intuition: if a risky object is in the vicinity of the first object and the second object is following the first object, then the second object is likely the risky object. In this manner, the process of FIG. 7 relies on the assumption that a follower is likely more risky than a non-follower and, therefore, likely corresponds to an object identified as risky.

In S702, system 100 receives reputational history corresponding to each object within a particular distance of the first object. For example, one or more of the sensors disclosed herein may identify the license plate numbers of all cars 20 within a particular distance of the first object. System 100 may then use the license plate numbers to identify the owner(s) of each car 20 and may subsequently acquire the criminal record of each such owner from a server 50. S702 may be part of S414, for example, and such received information may be included in the additional information. In some configurations, the criminal records may be anonymized.

In S704, system 100 may analyze the reputational history (e.g., criminal records) received in S702 and determine whether one or more object within the particular distance of the first object has a negative reputation. For example, if the criminal record for an owner of a car 20 indicates a recent conviction for assault, system 100 may determine that one or more object within the particular distance of the first object has a negative reputation (S704: YES). If the reputational histories received in S702 do not identify any negative reputations (e.g., none of the owners of cars 20 within the particular distance have a criminal record), system 100 may determine that no objects within the particular distance of the first object have a negative reputation (S704: NO). In some configurations, older records of negative behavior may carry less weight in the risk determination process.

If system 100 makes a positive determination (S704: YES) in S704, the process may proceed to S706. Conversely, if system 100 makes a negative determination (S704: NO) in S704, the process may proceed to S710.

In S706, system 100 may determine that the second object, which was determined to be following the first object in S412, is the object with the negative reputation. As described above, system 100 effectively applies the human knowledge that following another object is often a malicious activity, which further suggests that a follower has a higher likelihood of having a negative reputation. Consequently, the negative reputation is associated with the follower without directly confirming that the follower actually has the negative reputation.

In S708, system 100 may determine that the second object is likely a risk to the first object because the second object was associated with the negative reputation in S706. Consequently, the determination in S708 is reliant on the assumption made in S706 and avoids expending additional resources to determine the actual identity and reputation of the second object.

In S710, system 100 may determine that the second object is likely not a risk to the first object. Thus, if no negative reputations exist in the vicinity of the first object, system 100 may assume that the second object, which is following the first object, does not pose a risk to the first object.

In some configurations, system 100 may revise the internal models used for a following determination in response to determining that the second object is likely not a risk. More specifically, if system 100 determines that a second object is following the first object but thereafter determines that no malicious objects are in the vicinity of the first object, system 100 may assume that the following determination was a false positive and may adjust the following model accordingly. For example, system 100 may change a threshold time, a threshold distance, and/or a threshold motion correlation used to make a determination whether an object is following another object. In this manner, system 100 may engage in machine learning, for example.

While FIGS. 6 and 7 show example methods of determining the risk of a second object following the first object, such examples are merely a few of a plurality of possible ways to make the risk determination disclosed herein. Therefore, it should be appreciated that the risk determination is not limited to the methods of FIGS. 6 and 7.

The flowcharts and diagrams in FIGS. 1-7 illustrate the architecture, functionality, and operation of possible implementations of systems, methods, and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to comprise any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. For example, this disclosure comprises possible combinations of the various elements and features disclosed herein, and the particular elements and features presented in the claims and disclosed above may be combined with each other in other ways within the scope of the application, such that the application should be recognized as also directed to other embodiments comprising other possible combinations. The aspects of the disclosure herein were chosen and described in order to best explain the principles of the disclosure and the practical application and to enable others of ordinary skill in the art to understand the disclosure with various modifications as are suited to the particular use contemplated.

What is claimed is:

1. A method comprising:
    receiving first motion data corresponding to a first object including a geography through which the first object is traveling;
    receive an entropy of the geography;
    receiving second motion data corresponding to a second object;
    determining whether the second object is following the first object based on the first motion data and the second motion data and the entropy of the geography;
    receiving additional information from a source different from the first object and the second object;
    determining whether the second object poses a risk to the first object based on the additional information; and
    in response to determining that the second object is following the first object and that the second object poses a risk to the first object:
        providing a notification to a subscribing party, the notification indicating that the second object is following the first object and poses a risk to the first object.

2. The method of claim 1, wherein the geography is one of a plurality of geographies through which the first object has traveled and further comprising:
    determining a plurality of geographies through which the first object has traveled based on the first motion data;
    receiving geographical information corresponding to each geography of the plurality of geographies; and
    determining a respective entropy of each geography of the plurality of geographies based on the geographical information,
    wherein determining whether the second object is following the first object is further based on the entropy of each geography of the plurality of geographies; and
    wherein the respective entropy of any particular geography comprises a general characterization of the number of routes available within the particular geography.

3. The method of claim 2, wherein determining whether the second object is following the first object comprises:
    determining whether a particular amount of correlation exists between the first motion data and the second motion data during a particular period of time,
    wherein an amount of correlation between portions of the first motion data and the second motion corresponding to a geography with a lower entropy is weighted less than an amount of correlation between portions of the first motion data and the second motion corresponding to a geography with a higher entropy when determining whether the particular amount of correlation exists between the first motion data and the second motion data during the particular period of time.

4. The method of claim 1, wherein the geography is one of a plurality of geographies through which the first object has traveled and further comprising:
    determining a plurality of geographies through which the first object has traveled based on the first motion data;
    receiving geographical information corresponding to each geography of the plurality of geographies; and
    determining a respective entropy of each geography of the plurality of geographies based on the geographical information,
    wherein determining whether the second object poses a risk to the first object is further based on the entropy of each geography of the plurality of geographies.

5. The method of claim 1, wherein the additional information comprises:

a social relationship between the first object and the second object; and a reputational history of the second object.

6. The method of claim 1, wherein the additional information comprises information identifying a pattern of correlated motion between two objects that is an indicator of malicious activity, and wherein determining whether the second object poses a risk to the first object comprises:

determining, using the first motion data and the second motion data, whether correlated motion between the first object and the second object substantially matches the pattern of correlated motion; and determining that the second object poses a risk to the first object in response to determining that the correlated motion between the first object and the second object substantially matches the pattern of correlated motion.

7. The method of claim 1, wherein the additional information is additional motion data corresponding to a plurality of other objects in a same geography as the first object, and wherein determining whether the second object poses a risk to the first object comprises:

determining, using the first motion data, the second motion data, and the additional motion data, whether correlated motion between the first object and the second object is consistent with correlated motion between the first object and each object of the plurality of other objects in the same geography as the first object; and determining that the second object poses a risk to the first object in response to determining that the correlated motion between the first object and the second object is not consistent with the correlated motion between the first object and each object of the plurality of other objects in the same geography as the first object.

8. The method of claim 1, wherein the additional information comprises a reputational history of a plurality of objects within a particular distance of the first object, wherein determining whether the second object poses a risk to the first object comprises:

determining whether a particular object of the plurality of objects within the particular distance of the first object has a negative reputation;

in response to determining that the second object is following the first object and that the particular object of the plurality of objects has a negative reputation, determining that the second object is associated with the particular object; and in response to determining that the second object is associated with the particular object, determining that the second object poses a risk to the first object.

9. The method of claim 1, wherein receiving the first motion data comprises receiving global positioning satellite ("GPS") data for the first object using a GPS device, wherein receiving the second motion data comprises receiving image data of the second object using a camera associated with the first object, and wherein receiving the additional information comprises receiving the additional information from a database.

10. The method of claim 1, wherein determining whether the second object poses a risk to the first object based on the additional information is performed in response to determining that the second object is following the first object.

11. The method of claim 1, further comprising:

in response to determining that the second object is following the first object and that the second object poses a risk to the first object:

determining a course of action for the first object to avoid the second object; and providing a notification of the course of action to the first object, wherein the subscribing party includes one or more of the first object, a police force, and a security company.

12. A system comprising:

a first sensor;

a second sensor;

a processing system configured to:

receive first motion data corresponding to a first object including a geography through which the first object is traveling via the first sensor;

receive an entropy of the geography;

receive second motion data corresponding to a second object via the second sensor;

determine whether the second object is following the first object based on the first motion data and the second motion data and the entropy of the geography;

receive additional information from a source different from the first object and the second object;

determine whether the second object poses a risk to the first object based on the additional information; and in response to determining that the second object is following the first object and that the second object poses a risk to the first object:

provide a notification to a subscribing party, the notification indicating that the second object is following the first object and poses a risk to the first object.

13. The system of claim 12, wherein the geography is one of a plurality of geographies through which the first object has traveled and the processing system is further configured to:

determine a plurality of geographies through which the first object has traveled based on the first motion data;

receive geographical information corresponding to each geography of the plurality of geographies; and determining a respective entropy of each geography of the plurality of geographies based on the geographical information, wherein determining whether the second object is following the first object is further based on the entropy of each geography of the plurality of geographies; and wherein the respective entropy of any particular geography comprises a general characterization of the number of routes available within the particular geography.

14. The system of claim 13, wherein, when determining whether the second object is following the first object, the processing system is configured to determine whether a particular amount of correlation exists between the first motion data and the second motion data during a particular period of time, wherein, when determining whether the particular amount of correlation exists between the first motion data and the second motion data during the particular period of time, the processing system uses a weighting system to weight different portions of the first motion data and the second motion data such that an amount of correlation between portions of the first motion data and the second motion corresponding to a geography with a lower entropy is weighted less than an amount of correlation between portions of the first motion data and the second motion corresponding to a geography with a higher entropy.

15. The system of claim 12,
wherein the first motion data comprises first time and position information corresponding to respective positions of the first object determined by the first sensor at a plurality of points in time,
wherein the second motion data comprises second time and position information corresponding to respective positions of the second object determined by the second sensor at a plurality of points in time, and
wherein determining whether the second object poses a risk to the first object is further based on the first motion data and the second motion data.

16. The system of claim 12,
wherein the additional information comprises information identifying a pattern of correlated motion between two objects that is an indicator of malicious activity, and
wherein, when determining whether the second object poses a risk to the first object, the processing system is configured to:
determine, using the first motion data and the second motion data, whether correlated motion between the first object and the second object substantially matches the pattern of correlated motion; and
determine that the second object poses a risk to the first object in response to determining that the correlated motion between the first object and the second object substantially matches the pattern of correlated motion.

17. The system of claim 12,
wherein the additional information is additional motion data corresponding to a plurality of other objects in a same geography as the first object, and
wherein, when determining whether the second object poses a risk to the first object, the processing system is configured to:
determine, using the first motion data, the second motion data, and the additional motion data, whether correlated motion between the first object and the second object is consistent with correlated motion between the first object and each object of the plurality of other objects in the same geography as the first object; and
determine that the second object poses a risk to the first object in response to determining that the correlated motion between the first object and the second object is not consistent with the correlated motion between the first object and each object of the plurality of other objects in the same geography as the first object.

18. The system of claim 12,
wherein the additional information comprises a reputational history of a plurality of objects within a particular distance of the first object,
wherein, when determining whether the second object poses a risk to the first object, the processing system is configured to:
determine whether a particular object of the plurality of objects within the particular distance of the first object has a negative reputation;
in response to determining that the second object is following the first object and that the particular object of the plurality of objects has a negative reputation, determine that the second object is associated with the particular object; and
in response to determining that the second object is associated with the particular object, determine that the second object poses a risk to the first object.

19. The system of claim 12,
wherein the first sensor is a global positioning satellite ("GPS") device and the first motion data is GPS data for the first object,
wherein the second sensor is a camera and the second motion data comprises image data of the second object, and
wherein, when receiving the additional information, the processing system is configured to receive the additional information from a database.

20. A computer program product comprising:
a non-transitory computer readable storage medium having computer readable program code embodied therewith, the computer readable program code comprising:
computer readable program code configured to receive first motion data corresponding to a first object including a geography through which the first object is traveling;
computer readable program code configured to determine an entropy of the geography;
computer readable program code configured to receive second motion data corresponding to a second object;
computer readable program code configured to determine whether the second object is following the first object based on the first motion data and the second motion data and the entropy of the geography;
computer readable program code configured to receive additional information from a source different from the first object and the second object;
computer readable program code configured to determine whether the second object poses a risk to the first object based on the additional information; and
computer readable program code configured to, in response to determining that the second object is following the first object and that the second object poses a risk to the first object:
provide a notification to a subscribing party, the notification indicating that the second object is following the first object and poses a risk to the first object.

* * * * *